(12) United States Patent
Day et al.

(10) Patent No.: US 6,986,938 B2
(45) Date of Patent: Jan. 17, 2006

(54) BELLOWS WITH MOLDED PANELS

(75) Inventors: Steven D. Day, New Berlin, WI (US); Gary E. Mattson, New Berlin, WI (US); Steven B. Piacsek, Waukesha, WI (US)

(73) Assignee: A & A Manufacturing Co., Inc., New Berlin, WI (US)

(*) Notice: Subject to any disclaimer, the term of this patent is extended or adjusted under 35 U.S.C. 154(b) by 377 days.

(21) Appl. No.: 09/970,316

(22) Filed: Oct. 3, 2001

(65) Prior Publication Data

US 2003/0064193 A1 Apr. 3, 2003

(51) Int. Cl.
*B32B 7/02* (2006.01)

(52) U.S. Cl. .......................... 428/212; 428/57; 428/58; 428/60; 428/121; 92/42; 84/376 R; 403/90

(58) Field of Classification Search ................. 428/212, 428/57, 58, 60, 121, 403, 217, 126; 92/42; 84/376 R; 403/90
See application file for complete search history.

(56) References Cited

U.S. PATENT DOCUMENTS

| | | | |
|---|---|---|---|
| 4,336,747 A | 6/1982 | Totty et al. | |
| 4,570,964 A | 2/1986 | Tatay et al. | |
| 4,579,045 A | 4/1986 | Tominaga | |
| 4,745,848 A | 5/1988 | Hennig | |
| 5,021,271 A | 6/1991 | Hennig | |
| 5,413,831 A | 5/1995 | Nemoto et al. | |

FOREIGN PATENT DOCUMENTS

| | | |
|---|---|---|
| DE | 555207 C | 7/1932 |
| DE | 1509657 A | 8/1969 |
| DE | 3731770 A | 3/1989 |
| DE | 29514350 U | 11/1995 |
| FR | 1279424 A | 12/1961 |
| GB | 1073078 A | 6/1967 |
| GB | 2072294 A | 9/1981 |
| GB | 2296952 A | 7/1996 |
| JP | 10331791 A | 12/1998 |
| WO | WO 9307406 A | 4/1993 |

OTHER PUBLICATIONS

International Search Report for PCT/US02/31540.

*Primary Examiner*—Nasser Ahmad
*Assistant Examiner*—Jane Rhee
(74) *Attorney, Agent, or Firm*—Quarles & Brady LLP

(57) ABSTRACT

A multi-sided bellows cover has panel sections formed of extruded plastic panels in which rigid wall sections are connected at the fold lines by flexible web sections. The web sections are integrally molded by extrusion with at least one adjacent wall section, and many serial wall sections alternating with web sections may be integrally co-extruded with one another. Intermittently, a bead of one of the flexible web sections of one of the panel sections is captured in a slot of one of the rigid wall sections of another panel section.

8 Claims, 6 Drawing Sheets

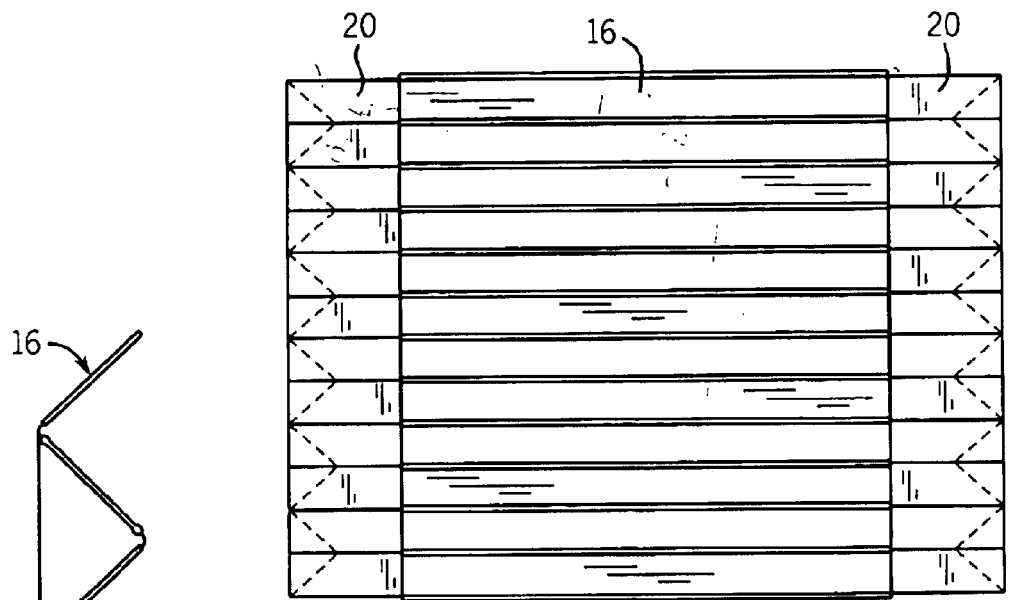
FIG. 2
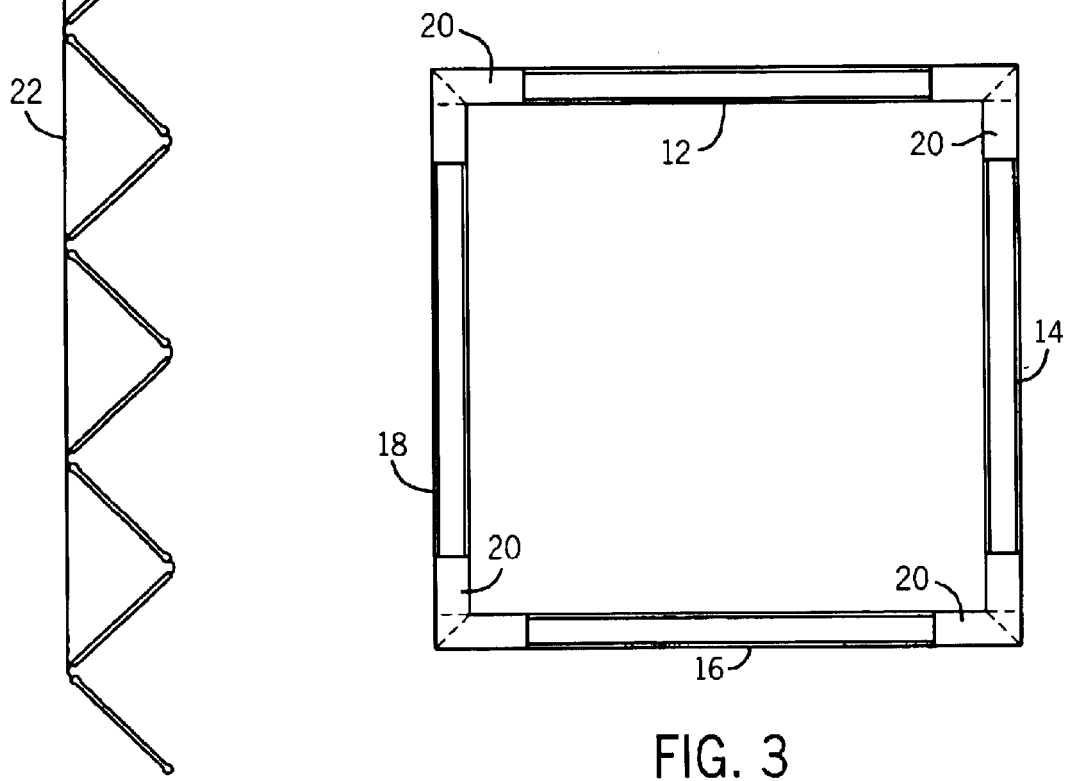
FIG. 4
FIG. 3

BELLOWS WITH MOLDED PANELS

CROSS-REFERENCE TO RELATED APPLICATIONS

Not applicable.

STATEMENT REGARDING FEDERALLY SPONSORED RESEARCH/DEVELOPMENT

Not applicable.

FIELD OF THE INVENTION

This invention relates to multi-sided bellows covers of the type which extend between relatively movable parts of a machine to which the bellows is mounted.

BACKGROUND OF THE INVENTION

Bellows are well known in industrial and other applications to enclose the space between two relatively movable parts of a machine. One such application is a lift table of the type that has a scissors or other lift mechanism to lift a table relative to a base. One end of the bellows is connected to one of the relatively movable parts of the machine, for example in a lift table to the table, and the other end of the bellows is connected to the other relatively movable portion, for example the base in a lift table, and the bellows encloses the machine between the two portions, i.e. between the base and the table in a lift table, typically where the mechanism resides. The bellows encloses this to protect it from dirt, coolants, cutting fluids, light, humidity and so forth.

Bellows have typically been made by providing accordion folded or sewn panels, made of for example rubberized or vinyl coated canvas or other fabric strips joined edge to edge to form the pleats of the panel, and connecting adjacent panels at the corners with flexible or foldable fabric which encloses the corners. As such, the bellows has a typically four-sided pleated construction. While a bellows must be expandable and contractible to enclose an axially variable space, a bellows must also provide resistance to lateral forces which may be exerted against the sides of the bellows to protect the enclosed space. The bellows must do this when it is both extended and retracted, and at all the positions in between.

The individual slats which make up the pleats of a bellows have typically been joined at their longitudinal edges either by bonding to a continuous sheet of flexible material and folding, by sewing or by a similar operation. The material of the bellows at the edges of the individual slats, i.e., at the apexes of the pleats, must be sufficiently flexible to permit expansion and contraction of the pleats as the bellows expands and contracts. However, the slats must also be rigid enough to support the weight of the bellows without sagging and to resist lateral forces which tend to deflect the bellows in the lateral direction perpendicular to the axial direction, which is the direction of expansion and contraction. The result in many of the prior art bellows has been to make the bellows of multi layer constructions, including flexible layers and rigid layers, or to re-enforce the bellows with wires or rigid panel components, resulting in expensive fabrication operations and considerable weight of the bellows.

SUMMARY OF THE INVENTION

The present invention provides a multi-sided bellows cover of the above-described type in which each panel includes a number of relatively rigid wall sections spaced apart by a number of web sections which are flexible relative to the wall sections, each web section being integrally molded with a longitudinal edge of at least one wall section. Therefore, the wall sections provide the needed rigidity, and the web sections provide the needed flexibility at the apexes of the pleats. As used herein, "molded" is meant to include extruded, injection molded, vacuum formed, press molded, blow molded or any other molding process.

In a preferred aspect, the wall sections and integral web section are extruded profiles, meaning that they are continuous for the length of the sections. In an especially preferred aspect, at least some of the web sections and adjacent wall sections are connected by a bead-in-slot connection. Therefore, these sections can be disconnected relative to one another. In a different aspect the web sections and adjacent wall sections can be integrally molded to provide a plurality of web sections and wall sections in one piece.

Bellows of the invention have their adjacent panels connected by corner sections, which can be a flexible piece of sheet material folded so as to provide the corner. The corner may be either a square corner or a chamfered corner, as is ordinary in other types of bellows. Bellows of the invention may also have a strap connected from peak to peak of the pleats to limit the extension of the bellows.

These and other objects and advantages of the invention will be apparent from the detailed description and drawings.

BRIEF DESCRIPTION OF THE DRAWINGS

FIG. 2 is a side plan view of the bellows of FIG. 1;

FIG. 3 is a top plan view of the bellows of FIGS. 1 and 2;

FIG. 4 is a cross-sectional view from the plane of the line for 4—4 of FIG. 1;

DETAILED DESCRIPTION OF THE PREFERRED EMBODIMENTS

Figure 1:
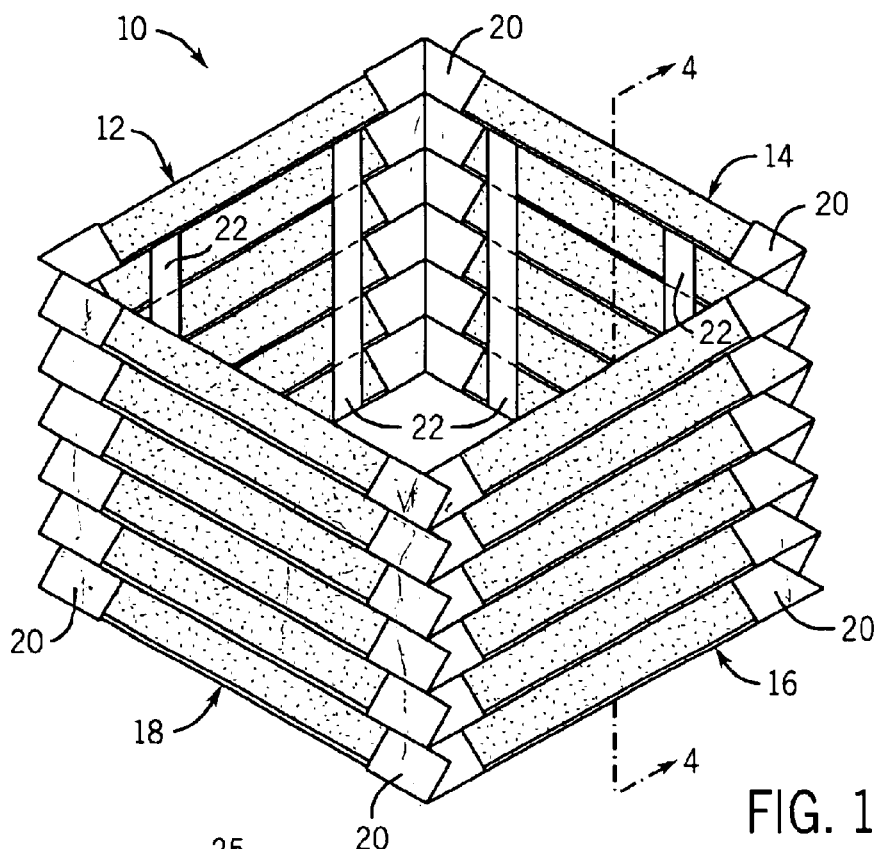
FIG. 1 is a perspective view of a bellows incorporating the invention.

Referring to FIGS. 1–4, a bellows cover 10 of the invention has four sides 12, 14, 16 and 18 which define an open-ended box like structure with accordion folded, or pleated, sides. The adjacent sides, 12, 14, 16 and 18 are connected to one another at their ends, i.e., at the corners of the bellows 10, by strips of folded fabric or other flexible sheet material 20. The sheet material 20 may be provided both on the inside and on the outside surfaces of the sides 12, 14, 16 and 18. In addition, the apexes of the pleats may be connected by limiting straps 22 (FIG. 4), as required (for example, two) on each side, on the inside of the bellows 10. The limiting strips 22 may be adhered to the peaks, or maybe affixed by stitching, stapling, rivets or other mechanical fasteners. In this context, mechanical fasteners should be interpreted to include adhesives, as well as other types of mechanical fasteners such as stitching, staples, rivets, bolts, screws, heat sealing or other means by which two components are secured.

Figure 1A:
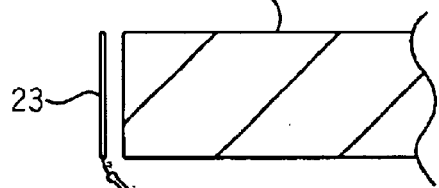
FIG. 1A is a partial cross-sectional view illustrating a possible end mounting configuration that may be applied to the bellows of FIG. 1.
Figure 1A:
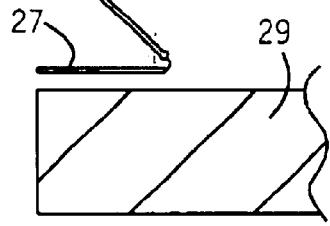

FIG. 1A illustrates one possible end mounting configuration for the bellows 10. The top slat 23 is axially directed and affixed by bolts, rivets, adhesive or other fasteners to the table 25 or other relatively movable component of the machine to which the bellows is assembled, and the bottom slat 27 is laterally directed and affixed by bolts, rivets, adhesive or other fasteners to the base 29 or other relatively movable component of the machine to which the bellows is assembled. Alternatively, both top and bottom slats may be axially directed or laterally directed, or any combination. Any suitable mounting configuration may be used with the invention, and it need not necessarily be a molded slat which is attached directly to the movable component. For example, an end slat of the bellows could be affixed to an adaptor array, such as loops of material supported on a bar, which is attached to the movable component.

Figure 6:
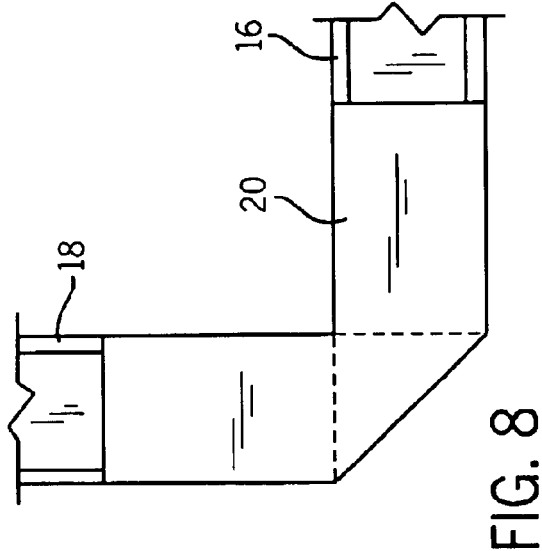
FIG. 6 is a top plan view of the corner of FIG. 5.
Figure 8:
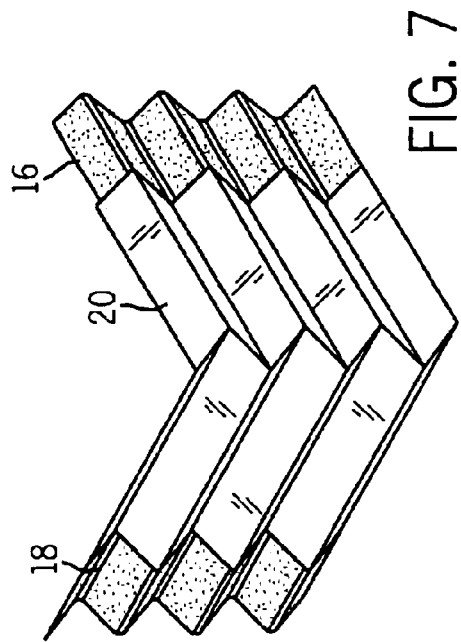
FIG. 8 is a top plan view of the corner of FIG. 7.
Figure 5:
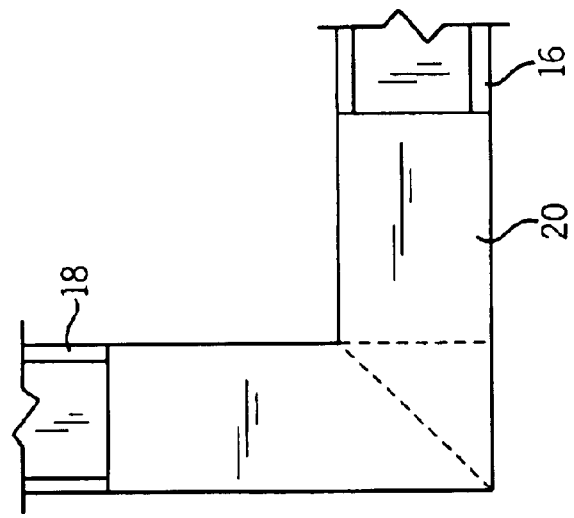
FIG. 5 is a partial view of a corner of the bellows showing a square corner construction.
Figure 7:
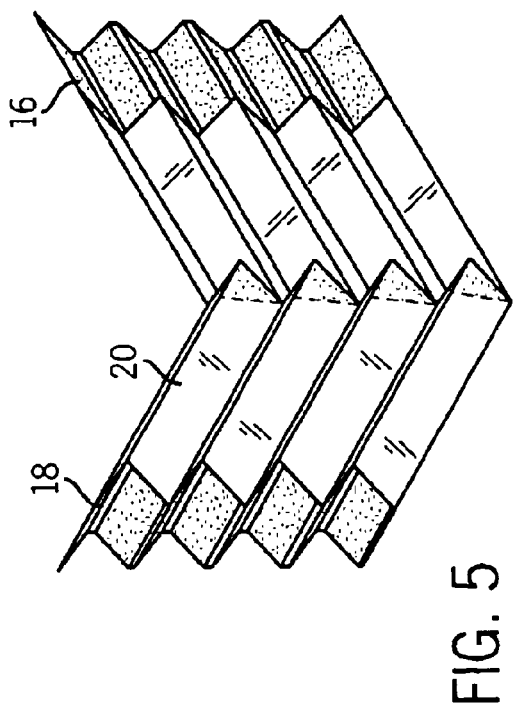
FIG. 7 is a partial perspective view illustrating a chamfered corner embodiment.
Figures 9, 10:
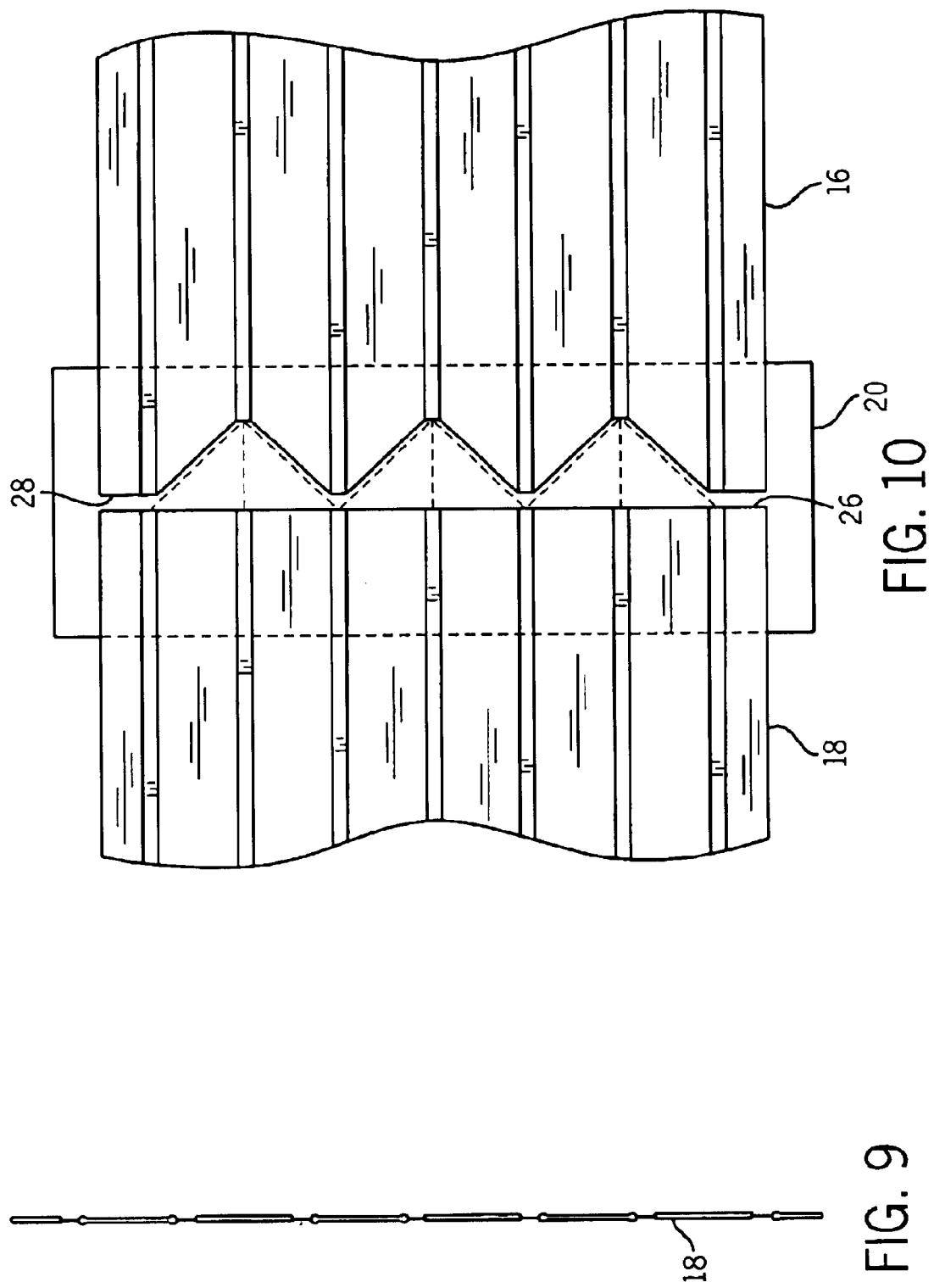
FIG. 9 is an end plan view of the panel shown in FIG. 10 laid flat.
FIG. 10 is a top plan view of two panels for a bellows of the invention laid flat over a strip of corner material for joining the two panels at a corner.

Referring to FIGS. 5–8, FIGS. 5 and 6 illustrate a square corner construction and FIGS. 7 and 8 illustrate a chamfered corner construction. Both of these corner constructions have been applied to bellows in the prior art, and can also be applied to a bellows of the invention. Referring to FIGS. 9 and 10, sides 16 and 18 are shown laid flat, and FIG. 10 illustrates one of the corner pieces 20 below the sides 16, 18, in position for fixation to the sides 16, 18. End 26 of panel 18 is cut straight and end 28 of panel 16 is cut in zig zag fashion with the peaks and valleys of the zig zag corresponding to fold lines of the panel 16, which fold lines line up with fold lines of the panel 18. A small minimum spacing, for example one-quarter inch, is provided between the end 26 and the end 28. Fabric panel 20, for example vinyl coated canvas or other fabric, is stitched, heat sealed, adhered, RF sealed, sonic welded or otherwise secured to the facing sides of the panels 16 and 18, and a panel 20 may be provided on each side of the panels 16 and 18. The assembly is then folded so as to form the pleats, and how it is folded determines whether the corner is square as shown in FIGS. 5 and 6 or chamfered as shown in FIGS. 7 and 8. As shown in FIG. 5, if the peaks on one side are made to correspond with the peaks on the other side, then the corner appears square in top view. However, if the valleys on one side are made to correspond to the peaks on the other side, then the corner appears chamfered as shown in FIG. 8 in top view. Note that in FIG. 10, the straight side 26 could have also been cut in zig zag fashion so as to fill in the v-shaped gaps between the straight side 26 and the valleys at the end of side 28. In addition, both sides 26 and 28 could have been cut straight as well, in which case the panels 16 and 18 would be spaced further apart than as shown in FIG. 10.

Figure 12:
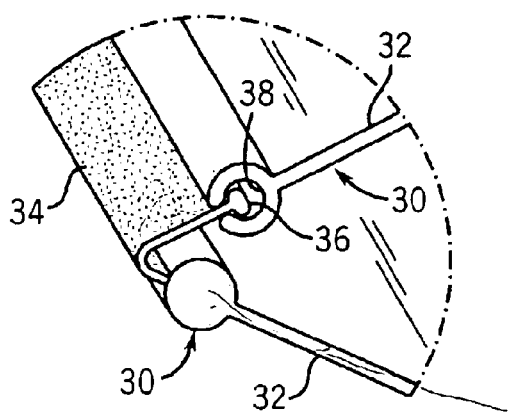
FIG. 12 is a detail view of one of the connections of the panel of FIG. 11.
Figure 11:
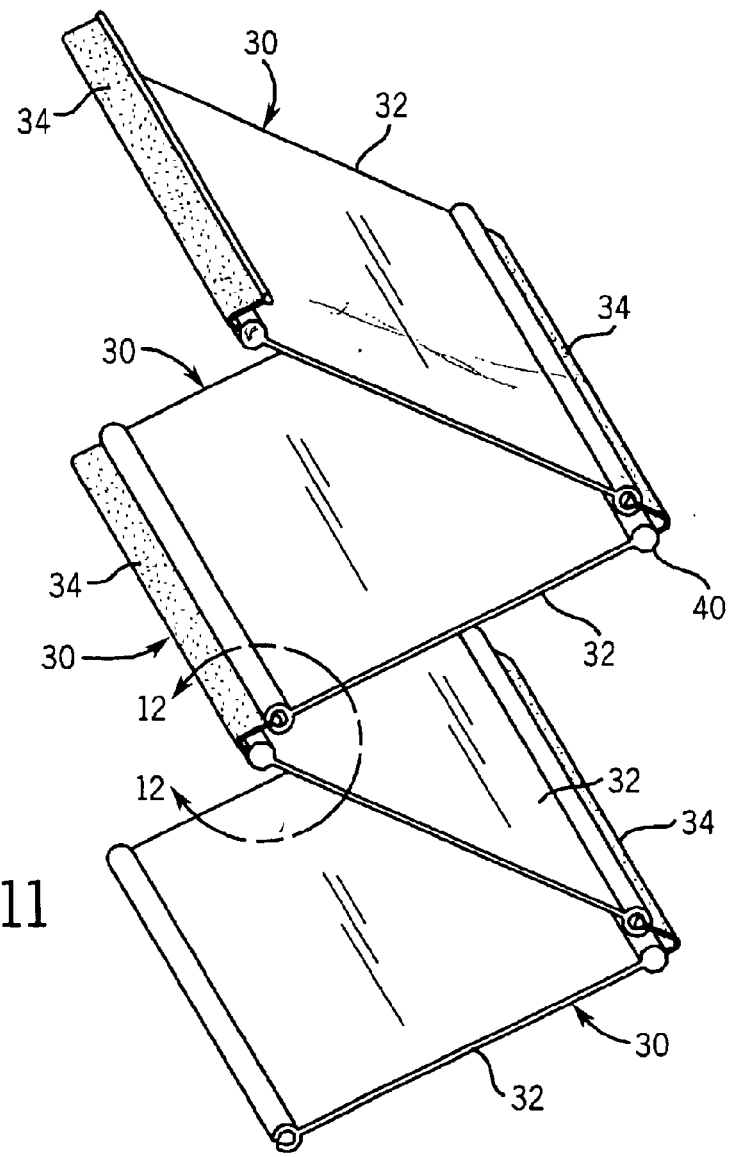
FIG. 11 is a partial perspective view illustrating how one embodiment of a panel for a bellows of the invention fits together.

Referring to FIGS. 11 and 12, a section of a panel 12, 14, 16 or 18 is shown. Each panel 12, 14, 16 and 18 includes a number of edge to edge connected panel sections 30, each of which has a relatively rigid wall section 32 integrally connected along one edge to a relatively flexible web section 34. The web sections 34 form the folds which are the peaks and valleys of the accordion folded panel. The wall sections and web sections are integrally molded so that at least one web section is integral along a longitudinal edge of at least one web section. The plastic of the wall sections 32 is harder and more rigid than the plastic of the web sections 34. For example, the wall sections 32 may be molded by extrusion of rigid PVC and the web sections 34 may be similarly and simultaneously molded by extrusion of flexible PVC, in one piece with the rigid PVC wall sections 32. Other materials may also be used for molding the panel such as polystyrene, polyethylene, polypropylene or other plastic materials. In some cases, the softer web sections are made softer either with an additive or by making them thinner, or making them of a different material than the wall section, for example, urethane. In any event, each panel section will typically be an extruded section, since it is longitudinally consistent, i.e., its lateral cross section is the same for the entire length of the section. As such, the panel sections can be made quite long, using the same extrusion dies.

As shown best in FIG. 12, a longitudinally extending bead 36 is provided at the free longitudinal edge of the web 34. The bead 36 is received in a longitudinally extending slot 38 at the free longitudinal edge of the wall section 32 of the adjacent panel section 30, the slot 38 being open on its side opposite from the main portion of the wall section 32 of the adjacent panel section 30. Thus, the web 34 can be slipped into the opening of the slot 38, with the bead 36 captured within the slot 38.

Molded wall and web sections as shown in FIGS. 11 and 12 are known and heretofore have been used for making accordion-folded folding doors. Such materials are available in many hardware or home improvement stores.

Figures 13, 14:
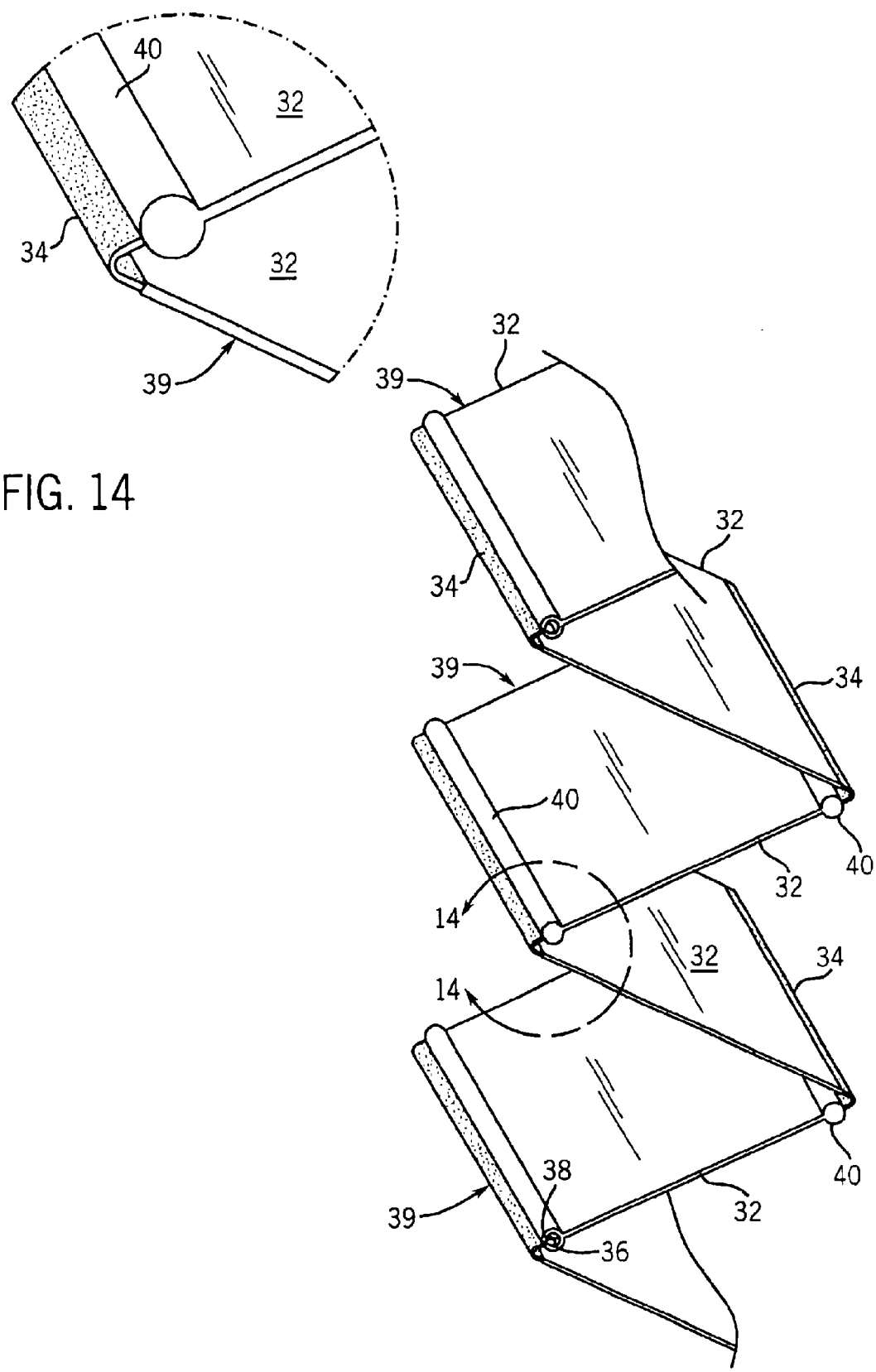
FIG. 13 is a view similar to FIG. 11 but illustrating an alternative embodiment of a panel.
FIG. 14 is a detail view illustrating one of the integrally connected corners of the panel section shown in FIG. 13.

FIGS. 13 and 14 illustrate an alternative construction of the panel sections 30. The construction of FIGS. 13 and 14 is essentially the same as that of FIGS. 11 and 12, except the panel sections 39 have multiple rigid wall sections 32 that are integrally connected with multiple flexible web sections 34. In the embodiment of FIG. 13, four wall sections 32 are integrally connected by four web sections 34 in each panel section 39. It is noted that in the embodiment of FIG. 11, each fold of the pleated panel section is supported by two enlarged sections, one being the enlarged section which defines the slot 38 and another being an enlarged section 40 which is solid and integrally molded with the adjacent wall section 32 and web sections 34. These sections provide stiffening at the folds. In the embodiment of FIG. 13, only one enlarged section, either the enlarged section which defines the slot 38, or the enlarged solid section 40, is provided adjacent to each fold of the pleated panel section 39.

Preferred embodiments of the invention have been described in considerable detail. Many modifications and variations to the preferred embodiments described will be apparent to those skilled in the art. For example, any number of rigid wall sections 32 and flexible web sections 34 could be co-extruded in one piece. Therefore, the invention should not be limited to the embodiments described, but should be defined by the claims which follow.

We claim:

1. In a multi-sided bellows cover for extending between relatively movable parts of a machine to which the bellows is mounted, one end of said bellows being affixed to one of said parts and an opposite end of said bellows being affixed to the other said part so that the bellows is extended when said parts move relatively apart and said bellows contracts when said parts move relatively together, said bellows having sides substantially enclosing the space between said parts as said parts move relatively together and apart, each side of the bellows including an accordion folded panel, the improvement wherein each said panel includes a plurality of relatively rigid wall sections spaced apart by a plurality of web sections which relative to said wall sections are flexible, wherein each said web section is integrally molded with a longitudinal edge of at least one wall section and wherein at least two adjacent sides of said bellows have corners between adjacent sides of the bellows and the corners are formed by a web of flexible material which is affixed to each of the sides, wherein at least some of the web sections and adjacent wall sections are connected by a bead-in-slot connection.

2. The improvement of claim 1, wherein said wall sections and integral web sections are extruded profiles.

3. The improvement of claim 1, wherein said corners are square.

4. The improvement of claim 1, wherein said corners are chamfered.

5. The improvement of claim 1, wherein each web section has a wall section along one longitudinal edge and a bead along the opposite longitudinal edge.

6. The improvement of claim 5, wherein a wall adjacent to said bead captures said bead in an open slot of said wall.

7. The improvement of claim 1, wherein multiple walls and webs are molded edge to edge in one piece.

8. The improvement of claim 1, further comprising a strap attached to said bellows which limits the extension of said bellows.

* * * * *

UNITED STATES PATENT AND TRADEMARK OFFICE
CERTIFICATE OF CORRECTION

PATENT NO. : 6,986,938 B2 Page 1 of 1
APPLICATION NO. : 09/970316
DATED : January 17, 2006
INVENTOR(S) : Steven D. Day et al.

It is certified that error appears in the above-identified patent and that said Letters Patent is hereby corrected as shown below:

Column 2

Line 22, "comer", should be --corner--.

Line 47, "comer", should be --corner--.

Line 51, "comer", should be --corner--.

Line 62, "comer", should be --corner--.

Column 3

Line 3, "comer", should be --corner--.

Line 52, "comer", should be --corner--.

Line 58, "comer", should be --corner--.

Signed and Sealed this

Twenty-fifth Day of July, 2006

JON W. DUDAS
*Director of the United States Patent and Trademark Office*